United States Patent
Lee et al.

(10) Patent No.: US 10,327,090 B2
(45) Date of Patent: Jun. 18, 2019

(54) DISTANCE RENDERING METHOD FOR AUDIO SIGNAL AND APPARATUS FOR OUTPUTTING AUDIO SIGNAL USING SAME

(71) Applicant: LG ELECTRONICS INC., Seoul (KR)

(72) Inventors: Tung Chin Lee, Seoul (KR); Jongyeul Suh, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/703,266

(22) Filed: Sep. 13, 2017

(65) Prior Publication Data

US 2018/0077514 A1     Mar. 15, 2018

Related U.S. Application Data

(60) Provisional application No. 62/393,659, filed on Sep. 13, 2016, provisional application No. 62/418,807, filed on Nov. 8, 2016.

(51) Int. Cl.
*G01H 7/00* (2006.01)
*H04S 7/00* (2006.01)

(52) U.S. Cl.
CPC ............. *H04S 7/306* (2013.01); *G01H 7/00* (2013.01); *H04S 7/304* (2013.01); *H04S 2420/01* (2013.01)

(58) Field of Classification Search
None
See application file for complete search history.

(56) References Cited

U.S. PATENT DOCUMENTS

| | | | | |
|---|---|---|---|---|
| 2016/0345116 | A1* | 11/2016 | Yen | H04S 3/004 |
| 2017/0325045 | A1* | 11/2017 | Baek | H04S 1/002 |
| 2017/0332186 | A1* | 11/2017 | Riggs | G06F 3/012 |

* cited by examiner

*Primary Examiner* — Curtis A Kuntz
*Assistant Examiner* — Kenny H Truong
(74) *Attorney, Agent, or Firm* — Birch, Stewart, Kolasch & Birch, LLP

(57) ABSTRACT

Disclosed are a distance rendering method used for audio signal output and an audio signal output apparatus using the same. The distance rendering method includes receiving a decoded audio signal, checking whether a distance between a user and a sound image is changed, if the distance is changed, calculating a gain parameter $g_{new}$ and a period parameter $\tau_{new}$, applied to room response modeling, based on the changed distance, so as to maintain a space characteristic, and generating room response modeling for maintaining the space characteristic even when the distance is changed, using the calculated period parameter $\tau_{new}$ and gain parameter $g_{new}$.

2 Claims, 13 Drawing Sheets

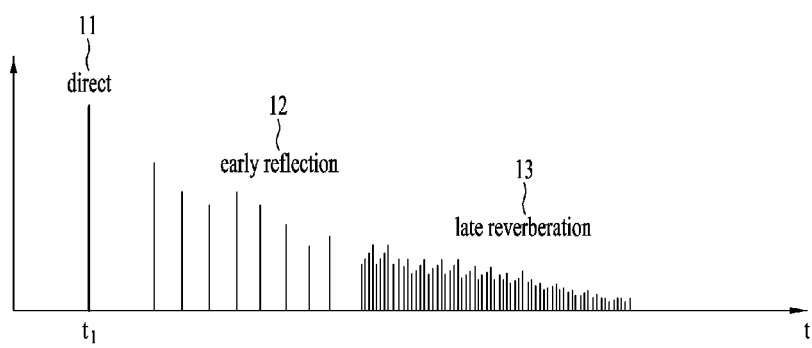
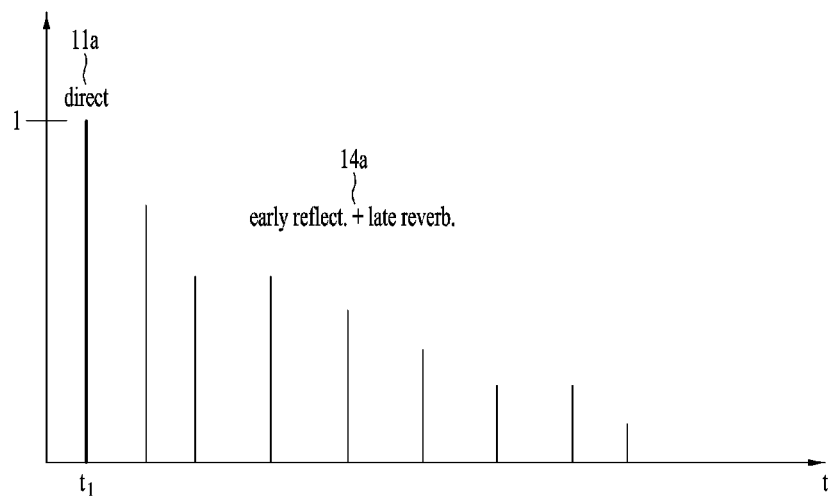

DISTANCE RENDERING METHOD FOR AUDIO SIGNAL AND APPARATUS FOR OUTPUTTING AUDIO SIGNAL USING SAME

CROSS-REFERENCE TO RELATED APPLICATIONS

Pursuant to 35 U.S.C. § 119(e), this application claims the benefit of U.S. provisional applications Nos. 62/393,659 filed on Sep. 13, 2016 and 62/418,807 filed on Nov. 8, 2016, which are hereby incorporated by reference as if fully set forth herein.

BACKGROUND OF THE INVENTION

Field of the Invention

The present invention relates to a distance rendering method used for audio signal output and an audio signal output apparatus using the same.

Discussion of the Related Art

Recently, with advances in information technology (IT), a variety of smart devices has been developed. Particularly, smart devices basically provide audio output having various effects. Therefore, various methods for more realistic audio output have been attempted in a virtual reality (VR) environment. Thereamong, a distance rendering method provides more realistic audio in a VR environment by adjusting sense of distance caused by the distance between a sound image and a user through a direct-to-reverberation (D/R) ratio. A conventional general distance rendering method will now be described.

For example, in order to reproduce, through a headphone or an earphone, an effect of localizing a sound image from an arbitrary direction in a VR space, information about the VR space and information about the direction of a sound source are needed. Generally, the information about the direction of the sound source is provided by a user. Accordingly, if a database (DB) of head-related transfer functions (HRTFs) measured in all directions is present, a sound image may be localized in a desired direction with reference to the provided direction information. Further, if a head tracker is used together with the DB, the sound image may be localized in a fixed direction regardless of movement of the head of a user. Generally, information about a space may be acquired by measuring a room impulse response (simply, "room response") measured in the corresponding space. However, since the room response cannot be actually measured in a "VR space", the room response may be artificially generated using a room impulse response modeling (hereinafter, simplified to "room modeling") method. If the generated room response is filtered together with an input signal, a user may perceive a spatial sense or reverberation for the measured space.

A user (listener) in an arbitrary space may move and the distance between a sound image and the user differs according to a moved location. This means that reverberant sound as well as the magnitude of a sound source to which the listener listens becomes different. Accordingly, a room response characteristic varies according to movement of a user.

FIG. 1 illustrates a conventional normal room response characteristic. Generally, the room response characteristic is divided into a direct part 11, an early reflection part 12, and a late reverberation part 13 as illustrated in FIG. 1. The direct part 11 is associated with the magnitude of a sound source and intelligibility. The early reflection part 12 and the late reverberation part 13 are associated with a spatial sense and reverberation of a sound source.

A conventional distance rendering method adjusts sense of distance through signal processing by modifying a room response. Generally, the conventional distance rendering method uses a D/R ratio. The D/R ratio is expressed by Equation (1).

$$D/R = \frac{P_D}{P_R} = \frac{\int_0^{t_1} h^2(t)d\tau}{\int_{t_1}^{t} h^2(t)dt} \quad (1)$$

In Equation (1), h(t) denotes a room response and $t_1$ denotes time until a response of the direct part 11 is received. As indicated by Equation (1), the D/R ratio is controlled by the ratio of energy of the direct part 11 to energy of the early reflection part 12 and the late reverberation part 13.

For reference, FIG. 2A illustrates a room response characteristic when the distance between a user and a sound image is not changed. The room response characteristic may be indicated by distinguishing between a direct part 11a and an early reflection and late reverberation part 14a, based on t1 of Equation (1).

For example, if it is desired that a relative distance between the user and the sound image be short, a gain of a direct part 11b of the room response may be adjusted to be increased and a gain of an early reflection and late reverberation part 14b may be adjusted to be decreased as illustrated in FIG. 2B. Then, a sound source sounds bigger and a reverberant sound sounds smaller.

On the contrary, if it is desired that a relative distance between the user and the sound image be increased, a gain of a direct part 11c may be adjusted to be decreased and a gain of an early reflection and late reverberation part 14c may be adjusted to be increased, as illustrated in FIG. 2C. Then, the sound source sounds smaller and the reverberant sound sounds bigger.

However, if it is desired that the distance between the sound image and the user be very close, a gain of the direct part is remarkably increased relative to a gain of the early reflection and a gain of the late reverberation part. In addition, if a remarkably modified gain is applied to a room response, the user may not feel reverberation even though the response has been measured in a space having reverberation. That is, a spatial sense is decreased as if the response is measured in an anechoic room (or dead room) and thus a spatial characteristic varies.

Moreover, a correlation between left and right ears (simply, binaural correlation) according to change in distance cannot be adjusted only by adjustment of the D/R ratio. Accordingly, if the distance between the sound image and the user is longer, a gain of the sound image is decreased and the binaural correlation is also decreased.

Accordingly, a new method capable of maintaining a spatial characteristic even when a relative distance between the user and the sound image is changed is needed. In addition, a new method capable of maintaining a binaural correlation characteristic based on the spatial characteristic even when a relative distance between the user and the sound image is changed is needed. That is, a binaural correlation value should be changed according to change in distance in order to maintain a spatial characteristic.

SUMMARY OF THE INVENTION

Accordingly, the present invention is directed to a distance rendering method used for audio signal output and an audio signal output apparatus using the same that substantially obviate one or more problems due to limitations and disadvantages of the related art.

An object of the present invention is to provide a new distance rendering method for maintaining a spatial characteristic during audio output in an arbitrary space even when a relative distance between a user and a sound image is changed.

Another object of the present invention is to provide a new distance rendering method for changing a correlation value so as to maintain a binaural correlation characteristic according to an initial spatial characteristic during audio output in an arbitrary space even when a relative distance between a user and a sound image is changed.

Another object of the present invention is to provide an audio output apparatus for providing audio output using a new distance rendering method.

Another object of the present invention is to provide an audio output system for providing audio output using a new distance rendering method.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, an audio distance rendering method used for audio output includes receiving a decoded audio signal, checking whether a distance between a user and a sound image is changed, if the distance is changed, calculating a gain parameter $g_{new}$ and a period parameter $\tau_{new}$, applied to room response modeling, based on the changed distance, so as to maintain a space characteristic, and generating room response modeling for maintaining the space characteristic even when the distance is changed, using the calculated period parameter $\tau_{new}$ and gain parameter $g_{new}$.

In accordance with another aspect of the present invention, an audio output apparatus includes an audio decoder configured to decode an input audio stream and output the decoded audio signal, and a renderer configured to render the decoded audio signal into an audio signal suitable for a space characteristic, wherein the renderer performs a process of checking whether a distance between a user and a sound image is changed, a process of calculating, when the distance is changed, a gain parameter $g_{new}$ and a period parameter $\tau_{new}$, applied to room response modeling, based on the changed distance, so as to maintain the space characteristic, and a process of generating room response modeling for maintaining the space characteristic even when the distance is changed, using the calculated period parameter $\tau_{new}$ and gain parameter $g_{new}$.

The gain parameter $g_{new}$ may be calculated by adjusting a gain of a room response by the same ratio and the period parameter $\tau_{new}$ may be calculated by changing a generation period of a late reverberation part among room response characteristics.

When the distance between the user and the sound image becomes shorter, a gain of a direct part, a gain of an early reflection part, and a gain of a late reverberation part among elements constituting the room response may be adjusted to be increased by the same ratio, and a generation period of the late reverberation part among the elements constituting the room response may be adjusted to be long, so that less late reverberation is generated in comparison with the amount of late reverberation when the distance is not changed.

When the distance between the user and the sound image becomes shorter, the gain parameter $g_{new}$ and the period parameter $\tau_{new}$ may be generated to have values larger than a gain parameter g and a period parameter $\tau$ when the distance is not changed.

When the distance between the user and the sound image becomes longer, a gain of a direct part, a gain of an early reflection part, and a gain of a late reverberation part among elements constituting the room response may be adjusted to be decreased by the same ratio, and a generation period of the late reverberation part among the elements constituting the room response may be adjusted to be short, so that a greater amount of late reverberation is generated in comparison with the amount of late reverberation when the distance is not changed.

When the distance between the user and the sound image becomes longer, the gain parameter $g_{new}$ and the period parameter $\tau_{new}$ may be generated to have values smaller than a gain parameter g and a period parameter $\tau$ when the distance is not changed.

In accordance with another aspect of the present invention, an audio distance rendering method used for audio output includes receiving a decoded audio signal, checking whether a distance between a user and the sound image is changed, and if the distance is changed, adjusting a binaural correlation based on the changed distance.

The adjusting the binaural correlation may include adjusting a correlation of a late reverberation part of a binaural room impulse response (BRIR).

The adjusting the binaural correlation may further include extracting the late reverberation part of the BRIR, calculating a parameter $IACC_{Late}$ corresponding to an interaural cross correlation (IACC) of the extracted late reverberation part, estimating a parameter $IACC_{Late\_\Delta d}$ corresponding to an IACC at a changed location with reference to information about a distance variation $\Delta d$, modeling the late reverberation part of the BRIR so as to have a correlation corresponding to the estimated parameter $IACC_{Late\_\Delta d}$ and replacing an existing late reveration part with the modeled late reverberation part, and changing a gain of the BRIR based on the modeled late reverberation part according to change in distance.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 1 illustrates a normal room response characteristic;

FIGS. 2A to 2C illustrate variations in room response characteristics according to a conventional distance rendering method;

DETAILED DESCRIPTION OF THE INVENTION

Figure 2B:
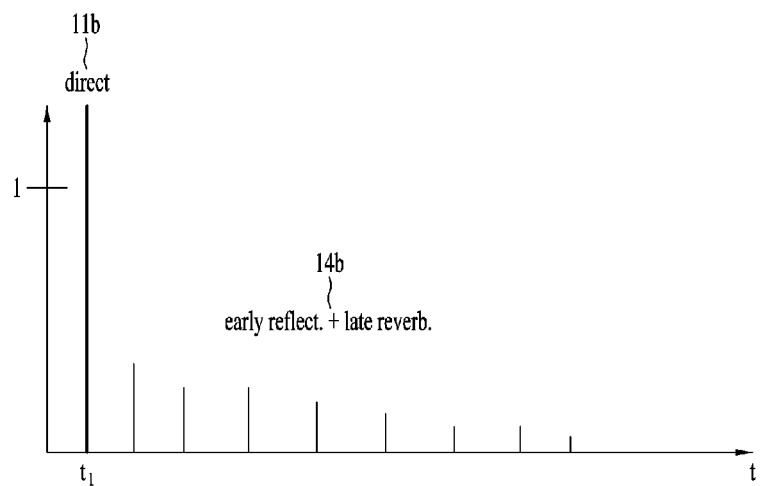

Reference will now be made in detail to the embodiments of the present invention, examples of which are illustrated in the accompanying drawings. In the drawings, the same or similar elements are denoted by the same reference numerals even though they are depicted in different drawings, and a detailed description of the same or similar elements will be omitted. The suffixes "module" and "unit" used in the description below are given or used together only in consideration of ease in preparation of the specification and do not have distinctive meanings or functions. In addition, in the following description of the embodiments disclosed herein, a detailed description of related known technologies will be omitted when it may make the subject matter of the embodiments disclosed herein rather unclear. In addition, the accompanying drawings have been made only for a better understanding of the embodiments disclosed herein and are not intended to limit technical ideas disclosed herein, and it should be understood that the accompanying drawings are intended to encompass all modifications, equivalents and substitutions within the sprit and scope of the present invention.

Figure 3:
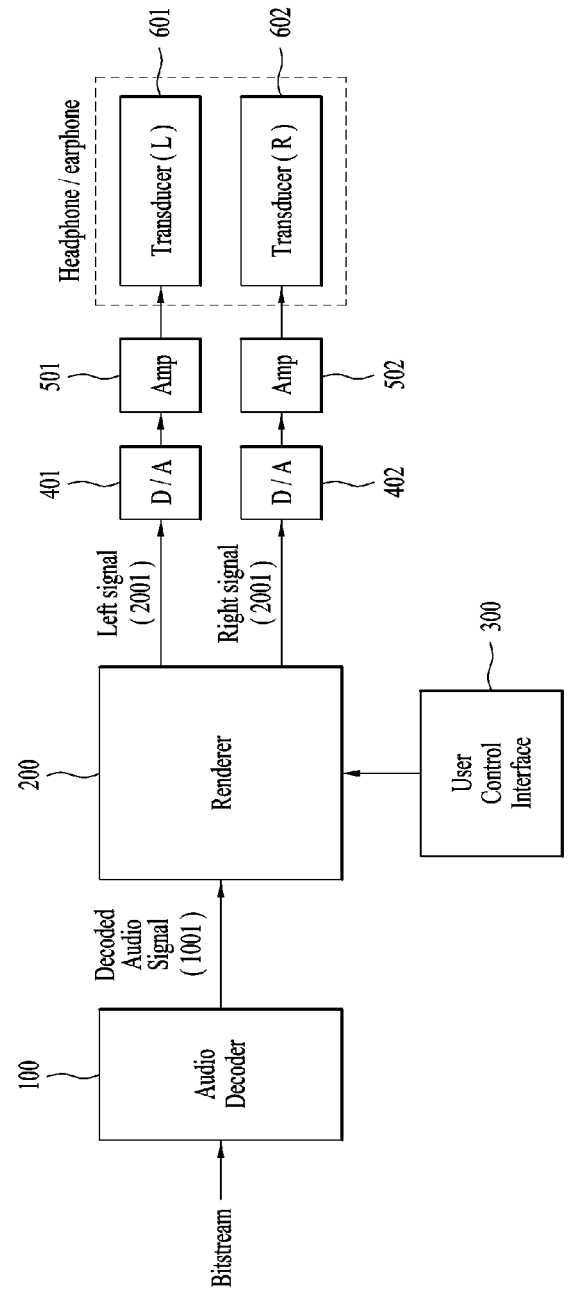
FIG. 3 illustrates an exemplary configuration of an audio output apparatus according to the present invention.

FIG. 3 illustrates an exemplary configuration of an audio output apparatus according to the present invention.

The audio output apparatus of the present invention includes an audio decoder 100, a renderer 200, a user control interface 300, digital-to-analog (D/A) converters 401 and 402, amplifiers 501 and 502, and transducers 601 and 602.

A bitstream input to the audio decoder 100 may be transmitted by an encoder (not shown) and may be input in the form of a compressed audio file (e.g., .mp3 or .aac). The audio decoder 100 decodes the input audio bitstream according to a coded format to output the decoded audio signal 1001. Generally, the decoded audio signal 1001 may be pulse code modulation (PCM) data (.pcm) but the present invention is not limited thereto. The decoded audio signal 1001 is input to the renderer 200. The renderer 200 outputs left and right signals 2001 by applying a new distance rendering method related to first and second embodiments of the present invention. The left and right output signals 2001 are reproduced through left and right transducers 601 and 602 of headphones (or earphones) via D/A converters 401 and 402 and amplifiers 501 and 502, respectively. Hereinafter, a detailed configuration and operation of the renderer 200 to which the new distance rendering method is applied will be described in detail.

Figure 4:
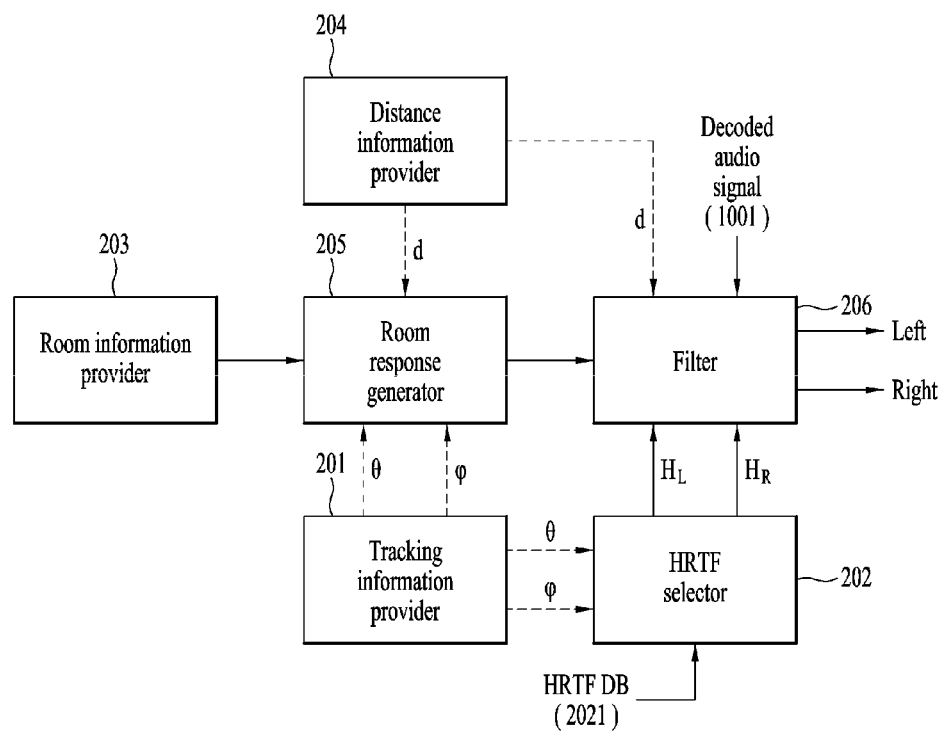
FIG. 4 illustrates a configuration of a renderer in the audio output apparatus, according to a first embodiment of the present invention.

FIG. 4 illustrates a detailed configuration of the renderer 200 in the audio output apparatus, according to a first embodiment of the present invention. The audio renderer 200 according to the first embodiment of the present invention includes a distance information provider 204, a room information provider 203, a room response generator 205, a tracking information provider 201, an HRTF selector 202, and a filter 206.

The distance information provider 204 provides information about the distance d between a user (listener) and a sound image. The room information provider 203 provides information about a room type (e.g., a rectangular room structure, a circular room structure, a partially open room structure, etc.) and information about a room size, corresponding to an arbitrary space in which a user is located and a VR space. The tracking information provider 201 provides a localization point (θ, Φ) of the sound image.

The room response generator 205 receives the information (e.g., the distance information, room type information, and tracking information (θ, Φ)) provided by the distance information provider 204, the room information provider 203, and the tracking information provider 201 and generates a room impulse response signal according to the new distance rendering method.

The audio renderer 200 further includes the HRTF selector 202. The tracking information provider 201 provides the localization point (θ, Φ) of a sound image desired to be currently output to the HRTF selector 202. The tracking information provider 201 may be a head tracker for tracking movement of a user or the user may directly provide related information through the user control interface 300. For example, the sound localization point (θ, Φ) provided by the tracking information provider 201 is information about an azimuth angle θ and an altitude angle Φ. The HRTF selector 202 extracts HRTF data corresponding to the sound localization point (θ, Φ) provided by the tracking information provider 201 from an HRTF (DB) 2021. If the HRTF data corresponding to the sound localization point (θ, Φ) is not present in the HRTF DB 2021, the HRTF selector 202 may generate new HRTF data by interpolating data present in the HRTF DB 2021.

The audio renderer 200 further includes the filter 206. The filter 206 receives the room impulse response signal generated by the room response generator 205 and the HRTF data $H_L$ and $H_R$ determined by the HRTF selector 202 and performs filtering using a preset filtering method to output an audio signal.

Particularly, new room modeling in which a period of generating a late reverberant part is adjusted is applied to the audio renderer 200 according to the first embodiment of the present invention as the new distance rendering method. Hereinafter, the audio renderer 200 and the distance rendering method according to the first embodiment of the present invention will be described in detail with reference to FIGS. 5 to 8.

Figure 5:
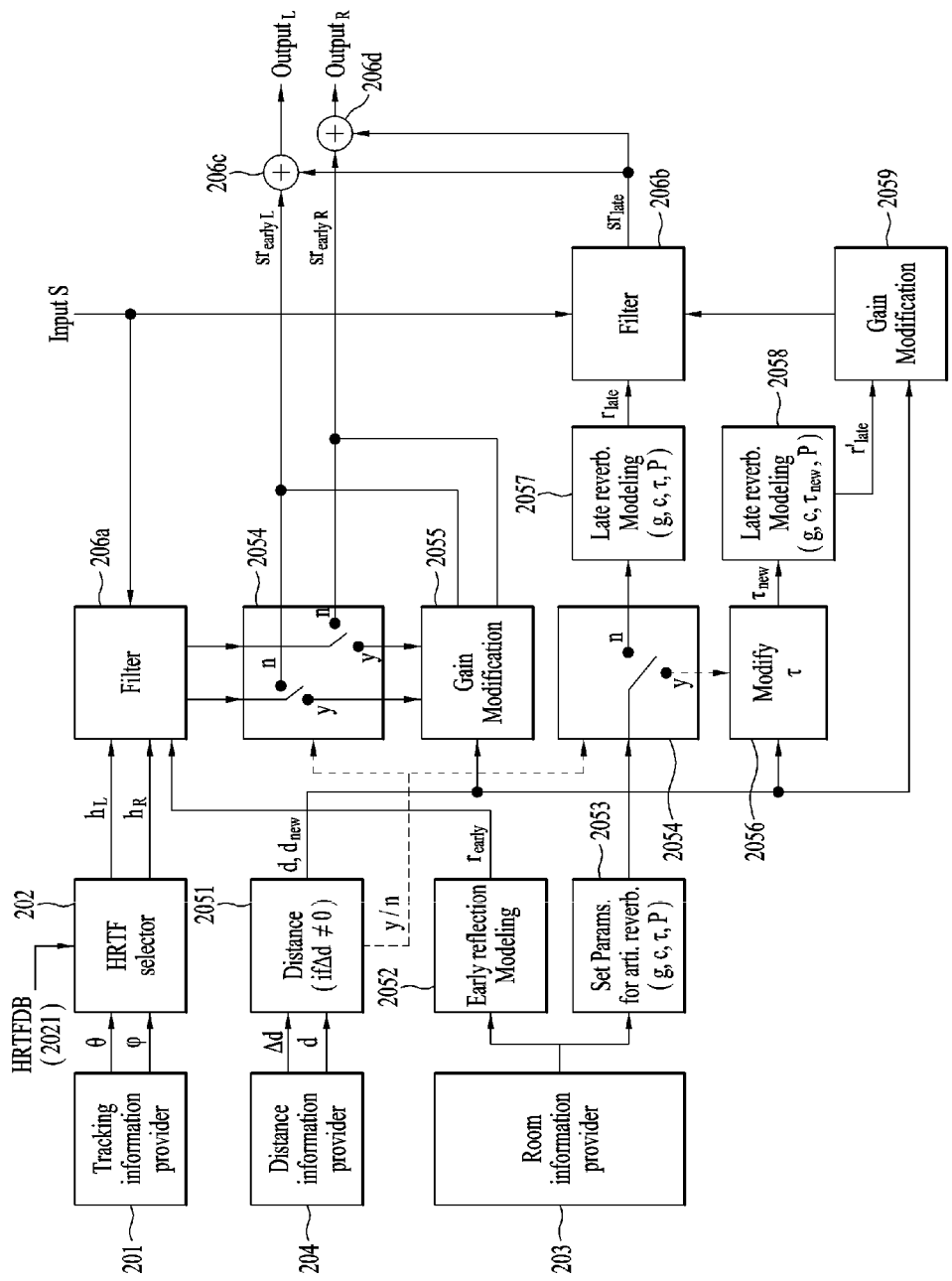
FIG. 5 illustrates a detailed configuration of a renderer to which a new distance rendering method is applied according to the first embodiment of the present invention.

FIG. 5 illustrates a detailed configuration of the renderer 200 to which the new distance rendering method is applied according to the first embodiment of the present invention. Particularly, FIG. 5 illustrates in detail the renderer 200 focusing on a late reverberation part modeling process of a room impulse response and a distance rendering method processing process performed based on the late reverberation part modeling process.

The above-described HRTF selector 202 extracts HRTF data $h_L$ and $h_R$ corresponding to tracking information $(\theta, \varphi)$ of a sound image provided by the tracking information provider 201 from the HRTF DB 2021. In addition, as described above, in a VR space environment, a user should directly model a space or a room. Therefore, the user may select preset values similar to values of a room that is desired to be made or directly input room characteristic information RT (room shape, room size, etc.), through the room information provider 203. The distance information provider 204 provides information about a relative distance between a user and a sound image.

A distance determiner 2051 determines whether the location of a user is changed, from the information about the distance provided by the distance information provider 204. That is, the distance determiner 2051 controls a switching means 2054 to select an operation according to a path "y" when it is determined that the relative location of the user is changed. Meanwhile, the distance determiner 2051 controls the switching means 2054 to select an operation according to a path "n" when it is determined that the relative location of the user is not changed.

First, the operation according to the path "n" through the switching means 2054 will now be described. That is, the operation is performed in the case in which a distance variation $\Delta d$ out of the distance information provided by the distance information provider 204 is 0, i.e., when the relative location of the user is not changed. In this case, a switch flag of the switching means 2054 is selected as the path "n".

A room response may generally enable individual modeling of an early reflection part and a late reverberation part. In FIG. 5, the early reflection part is modeled by an early reflection modeling unit 2052 and the late reverberation part is modeled by a late reverberation modeling unit 2057 after parameters g, c, $\tau$, and P are set by a parameter setting unit 2053 based on the room characteristic information.

An early reflection part $r_{early}$ modeled by the early reflection modeling unit 2052 is filtered together with the extracted HRTF data $h_L$ and $h_R$ and an input audio signal s by a first filter 206a and the first filter 206a generates left and right early reflection signals $sr_{early\_L}$ and $sr_{early\_R}$.

A late reverberation part $r_{late}$ modeled by the late reverberation modeling unit 2057 is also filtered together with the input audio signal s by a second filter 206b and the second filter 206b generates a late reverberation signal $sr_{late}$. The late reverberation signal $sr_{late}$ signal and the early reflection signals $sr_{early\_L}$ and $sr_{early\_R}$ are added by adders 206c and 206d and then output as rendered audio signals $Output_L$ and $Output_R$.

Next, the operation according to the path "y" through the switching means 2054 will now be described. That is, the operation is performed in the case in which the distance variation $\Delta d$ out of the distance information provided by the distance information provider 204 is not 0, i.e., when the relative location of the user is changed. In this case, the switch flag of the switching means 2054 is selected as the path "y".

If the user moves (i.e., $\Delta d \neq 0$), a first gain modification unit 2055 of FIG. 5 generates a new gain parameter $g_{new}$ obtained by changing a gain parameter g in proportion to a moved distance. A gain of a room response is adjusted using the new gain parameter $g_{new}$.

In addition, if the user moves (i.e., $\Delta d \neq 0$), a $\tau$-modification unit 2056 of FIG. 5 generates a new period parameter $\tau_{new}$ by changing a period parameter $\tau$ in proportion to a moved distance. As a result, the late reverberation part is modeled by a late reverberation modeling unit 2058 based on the parameters g, c, $\tau_{new}$, and P changed according to the room characteristic information. A gain of a modeled late reverberation part $r'_{late}$ is adjusted by a second gain modification unit 2059. The magnitude of the gain adjusted by each of the first gain modification unit 2055 and the second gain modification unit 2059 will be described in detail with reference to FIG. 8 and Equation (3).

The second filter 206b performs filtering on an output signal of the second gain modification unit 2059 and the input audio signal s and generates the late reverberation signal $sr_{late}$.

The adders 206c and 206d add the output signals $sr_{late}$ of the second filter 206b to the output signals $sr_{early\_L}$ and $sr_{early\_R}$ of the first gain modification unit 2055 and generate the rendered audio signals $Output_L$ and $Output_R$.

Figure 6:
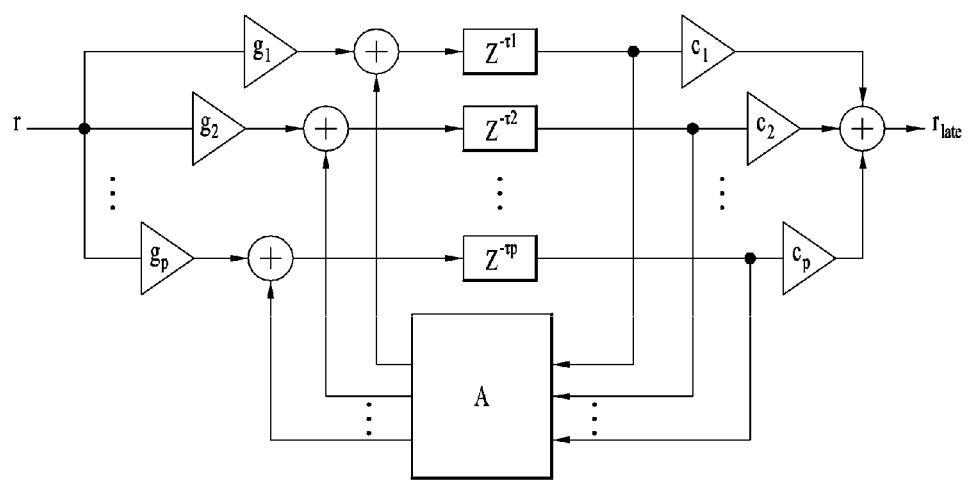
FIG. 6 illustrates an operation of a reverberator to which the new distance rendering method is applied according to the first embodiment of the present invention.

FIG. 6 illustrates an operation of a reverberator to which the new distance rendering method is applied according to the first embodiment of the present invention. As described above, the new distance rendering method according to the first embodiment of the present invention determines a new room modeling scheme by modifying a part of parameters applied to room modeling when the location of a user is changed in an arbitrary space (i.e., $\Delta d \neq 0$). Especially, the new distance rendering method generates a room response signal that maintains a spatial characteristic as a result of new room modeling. A parameter modified for new room modeling may be a reverberation generation period parameter $\tau$ used for late reverberation modeling. That is, a new parameter $\tau_{new}$ is applied so that a late reverberation part characteristic to which the reverberation generation period parameter $\tau$ is applied is maintained to be suitable for the spatial characteristic. In addition, the new distance rendering method generates a new gain parameter $g_{new}$ which is applied to new room modeling. Particularly, the new gain parameter $g_{new}$ adjusts a gain of a direct part, a gain of an early reflection part, and a gain of a late reverberation part of a room response by the same ratio in proportion to change in distance.

The early reflection modeling unit 2052 may model only parts from the direct part to the early reflection part of the room response and use conventional normal modeling methods. The late reverberation part of the room response is modeled using an artificial reverberator in each of the late reverberation modeling units 2057 and 2058. The artificial reverberator has the structure of a feedback delay network (FDN) including a plurality of comb filters as illustrated in FIG. 6. Parameters $(g(g_1, g_2, \ldots, g_P), c(c_1, c_2, \ldots, c_P), \tau(\tau_1, \tau_2, \ldots, \tau_P),$ and P) indicated in FIG. 6 are set by the parameter setting unit 2053 of FIG. 5.

The parameter P indicates the number of comb filters in FIG. 6. Although better performance is obtained as the number of comb filters is increased, since a total amount of computations is also increased, a proper number of comb filters is required according to a given environment. The parameter $\tau$ represents a total delay of the comb filters and a relationship of $\tau = \tau_1 + \tau_2 + \ldots + \tau_P$ is satisfied. In this case, $\tau_1, \tau_2, \ldots, \tau_P$ may have values which are not in a multiple relationship. For example, if P=3 and $\tau$=0.1 ms, then $\tau_1, \tau_2,$ and $\tau_3$ may be set such that $\tau_1$=0.033 ms, $\tau_2$=0.05 ms, and $\tau_3=0.0017$ ms. If the parameter $\tau$ which determines a total delay of the comb filters is applied to room response modeling, the parameter $\tau$ is used as a generation period of a specific signal part. In the present invention, the parameter $\tau$ is applied to the late reverberation modeling units 2057 and 2058 for the late reverberation part as described above and is used as a generation period of the late reverberation part.

The parameters $g=[g_1, g_2, \ldots, g_P]$ and $c=[c_1, c_2, \ldots, c_P]$ are values given from the user and are set to values less than 1. When the late reverberation part is modeled using the FDN structure of FIG. 6, optimal parameter values of a desired room response may be arbitrarily set by the user based on given information RT (room shape, room size, etc.).

Figure 7A:
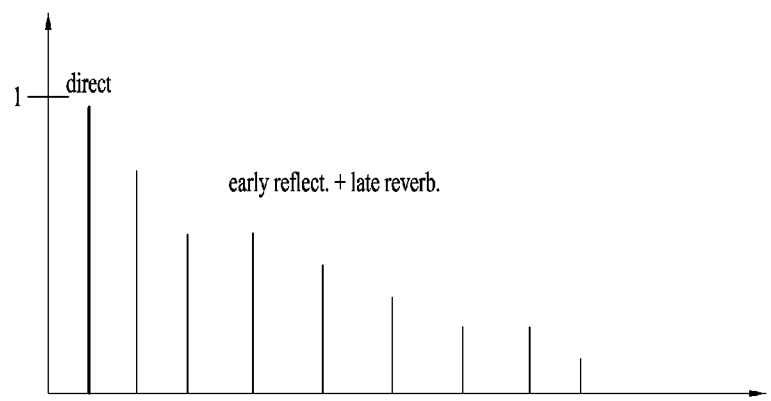
FIGS. 7A to 7C illustrate room response characteristics to which the new distance rendering method according to the first embodiment of the present invention is applied.
Figure 7B:
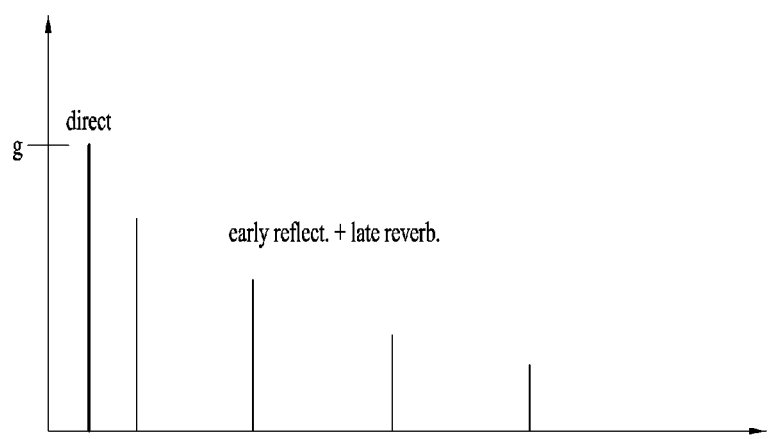
Figure 7C:
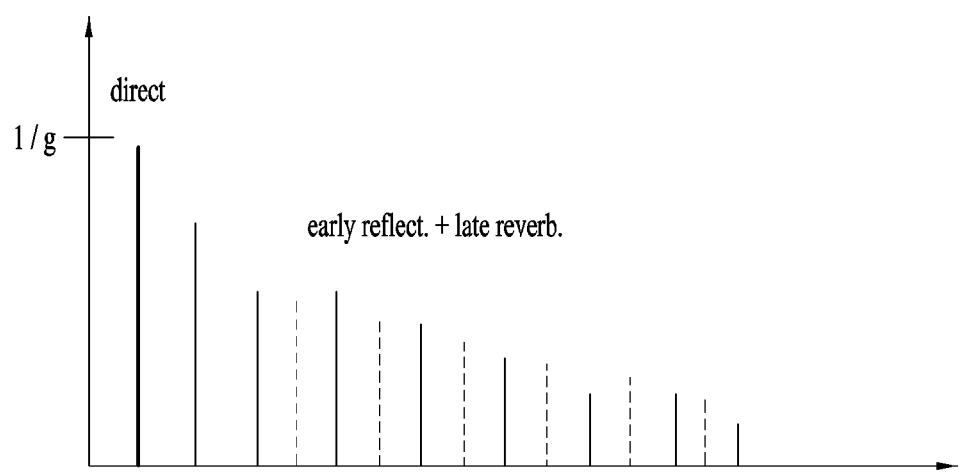

FIGS. 7A to 7C illustrate room response characteristics to which the new distance rendering method according to the first embodiment of the present invention is applied. If the location of a user or a sound image is changed, a room response is also changed. In a VR environment, a room response which differs according to change in location of the user (listener) may be controlled by the distance rendering method. As described above, the new distance rendering method according to the first embodiment of the present invention models a late reverberation part of the room response as illustrated in FIG. 7B or 7C by linking the generation period (parameter $\tau$) of the late reverberation part with a change in relative distance, in order to perform distance rendering while maintaining a conventional spatial characteristic.

Referring to FIGS. 7A to 7C, according to the first embodiment of the present invention, a gain variation value g (>1) generated as the distance between a user and a sound image is shorter or longer is identically applied to the direct part and the early/late reverberation part. According to the first embodiment of the present invention, if the relative distance between the user and the sound image is short as illustrated in FIG. 7B, the comb filter delay $\tau$ of the artificial reverberator of FIG. 6 is set to be greater than a conventional value, so that the amount of late reverberation is reduced. According to the first embodiment of the present invention, if the relative distance between the user and the sound image is long as illustrated in FIG. 7C, the comb filter delay $\tau$ is set to be smaller than a conventional value, so that the amount of late reverberation is further increased.

Referring to FIG. 7B, although a maximum gain value of the modeled late reverberation part is greater than a gain of the conventionally modeled late reverberation part (e.g., FIG. 2B), the amount of reverberation is decreased. On the other hand, referring to FIG. 7C, although the maximum gain of the modeled late reverberation part is less than the gain of the conventionally modeled late reverberation part (e.g., FIG. 2C), the amount of reverberation is increased. A D/R ratio used to apply distance rendering is a value measured by the ratio of energy. Accordingly, the modeling scheme of FIG. 7B or 7C leads to a result similar to the conventional method (e.g., FIG. 2B or 2C) in terms of an energy ratio calculated by the D/R ratio. That is, even when the relative distance becomes short or long, a problem of excessively increasing a gain of a specific component (the direct part or late reverberation part) is solved while maintaining a similar D/R ratio. Consequently, when the first embodiment of the present invention is applied, distortion of a spatial characteristic due to the conventional excessive gain is overcome.

Figure 8:
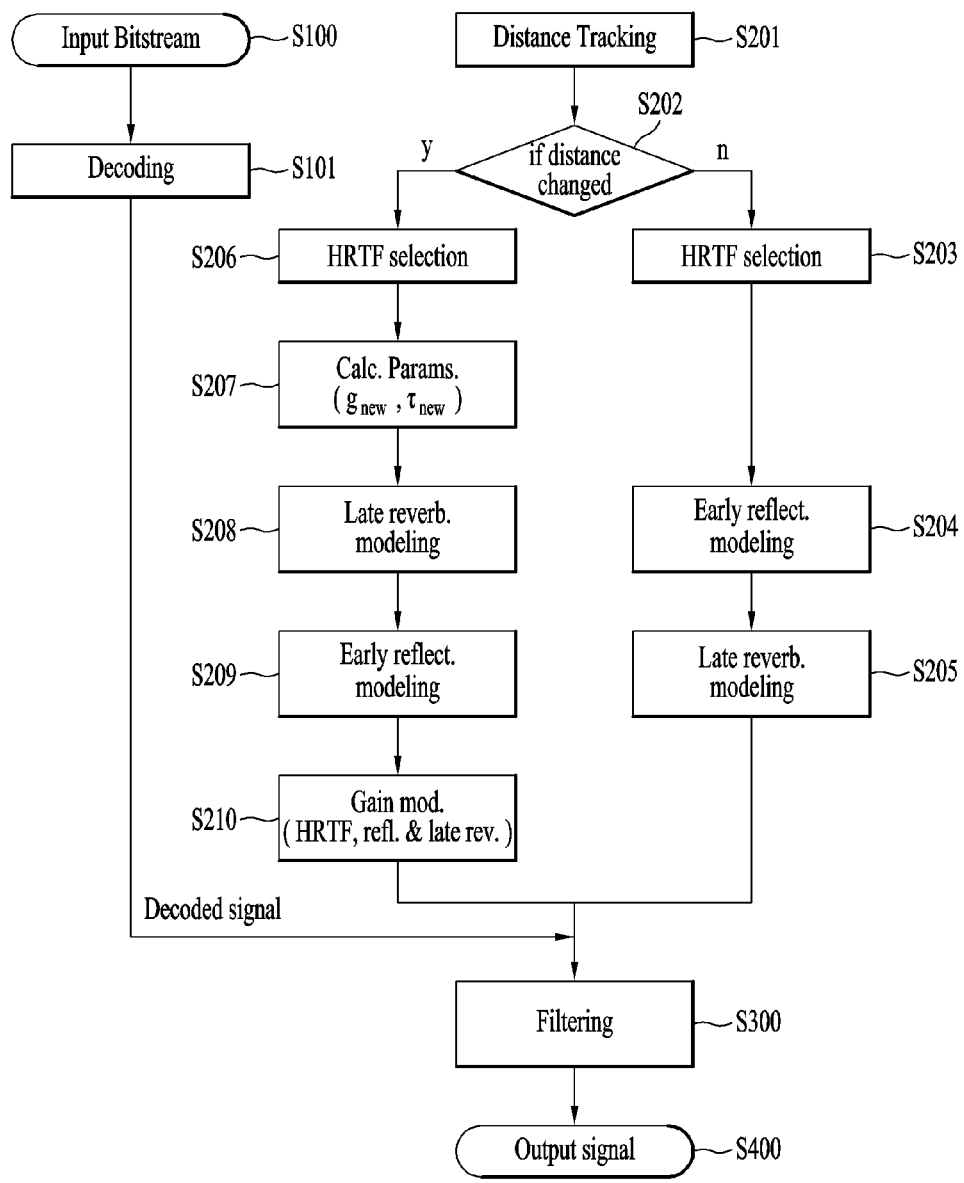
FIG. 8 is a flowchart illustrating the new distance rendering method applied to output of an audio signal according to the first embodiment of the present invention.

FIG. 8 is a flowchart illustrating a new distance rendering method applied to output of an audio signal according to the first embodiment of the present invention.

A bitstream is received (S100). The bitstream is decoded and output as a decoded signal (S101). It is determined through a distance tracking process (S201) whether there is change in distance (S202).

If there is change in distance, the next process (path "y") is performed. An HRTF is extracted from an HRTF DB with reference to head tracking information (S206). A new gain parameter $g_{new}$ and a new period parameter $\tau_{new}$ are calculated by calculating the amount of change in distance (S207). A new late reverberation part is modeled using the calculated period parameter $\tau_{new}$ (S208). An early reflection part is modeled according to a conventional scheme (S209). The calculated gain parameter $g_{new}$ is applied to the HRTF, the modeled early reflection part, and the modeled late reverberation part (S210). The HRTF, early reflection part, and late reverberation part are filtered together with the decoded signal in step S101 (S300). As a result of filtering, a rendered audio signal is output (S400).

Meanwhile, if it is determined in step S202 that there is no change in distance, the next process (path "n") is performed. The HRTF is extracted from the HRTF DB with reference to the head tracking information (S203). An early reverberation part is modeled (S204). A late reverberation part is modeled (S205). The HRTF, early reflection part, and late reverberation part are filtered together with the decoded signal in step S101 (S300). As a result of filtering, the rendered audio signal is output (S400).

In step S207, a process of generating the new gain parameter $g_{new}$ and the new period parameter $\tau_{new}$ is as follows. If a distance variation $\Delta d$ is not 0, since it is determined that a user moves, a parameter $\tau$ associated with a late reverberation generation period is modified. The new parameter $\tau_{new}$ is calculated as indicated by Equation (2)

$$\tau_{new} = \frac{d^2}{d_{new}^2}\tau = \frac{d^2}{(d+\Delta d)^2}\tau \qquad (2)$$

In Equation (2), d denotes the distance (an original distance) between a user and a sound image. In consideration of an inverse square law indicating that the magnitude of a sound pressure is inversely proportional to the square of distance, the square of d is applied. Therefore, if the modified period $\tau_{new}$ is used as a new parameter of an artificial reverberator, since the value of $\tau_{new}$ becomes small as the distance between the user and the sound source becomes long ($\Delta d>0$), a greater amount of reverberation is generated in a unit time. Meanwhile, since the value of $\tau_{new}$ is increased as the distance between the user and the sound source becomes short ($\Delta d<0$), less reverberation is generated in a unit time.

The amount of variation in gain of a room response according to change in distance is calculated in step S207 and the gain modification units 2055 and 2059 of FIG. 5 and is indicated by Equation (3).

$$g_{new} = \frac{d^2}{d_{new}^2}g = \frac{d^2}{(d+\Delta d)^2}g \qquad (3)$$

Similar to Equation (2), in consideration of an inverse square law indicating that the magnitude of a sound pressure is inversely proportional to the square of distance, the square of d is applied. The modified gain parameter $g_{new}$ is applied to the extracted HRTF responses $h_L$ and $h_R$ and the modeled early reflection part $r_{early}$ in the gain modification unit 2055. The modified gain parameter $g_{new}$ is also applied to the late reverberation part $r'_{late}$ in the gain modification unit 2059. That is, the modified gain parameter $g_{new}$ is identically applied to all room response signals, thereby preventing gain from being excessively generated. For example, since the value of $g_{new}$ is decreased as the distance between the user and the sound source becomes long ($\Delta d>0$), a total gain value is decreased by the same ratio as illustrated in FIG. 7C. Meanwhile, since the value of $g_{new}$ is increased as the distance between the user and the sound source becomes short ($\Delta d<0$), the total gain value is increased by the same ratio as illustrated in FIG. 7B.

Figure 9:
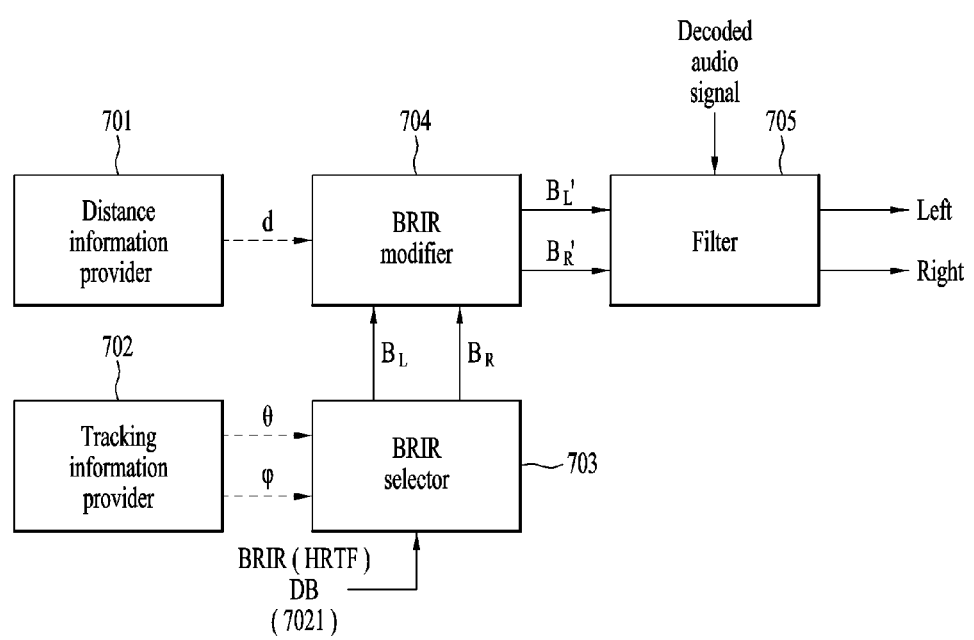
FIG. 9 illustrates a configuration of a renderer in an audio output apparatus according to a second embodiment of the present invention.

FIG. 9 illustrates a configuration of a renderer in an audio output apparatus according to a second embodiment of the present invention. Since the second embodiment is targeted at maintaining a binaural correlation relation even when the location of a user is changed in an arbitrary space, a binaural room impulse response (BRIR) will be described as an example of modeling.

Figure 2C:
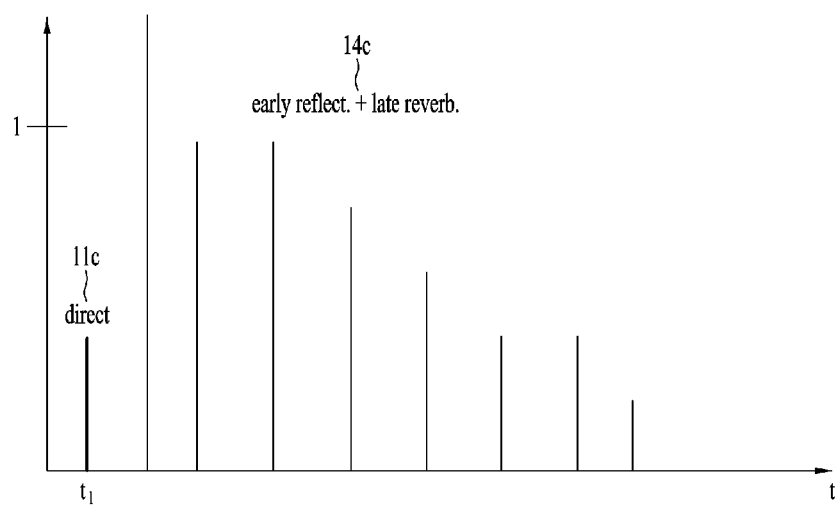

Referring to FIGS. 2A to 2C and the D/R ratio of Equation (1), sense of distance may be changed such that if it is desired to change the distance between a user and an image sound to be short, a gain of a direct part of a room response is changed to be high and, if it is desired to change the distance between the user and the image sound to be long, the gain of the direct part of the room response is changed to be low. However, in an actual space environment, if the user is distant from the sound image, since an influence of reverberation increases, a binaural correlation decreases. Meanwhile, if the user is near to the sound image, since an influence of the reverberation decreases, the binaural correlation increases. That is, a conventional D/R ratio may adjust gain but may not adjust correlation of a response. To overcome the above problem, in accordance with the second embodiment of the present invention, modeling is performed in such a way that correlation of a late reverberation part of a measured BRIR is adjusted according to change in a relative distance.

In accordance with the second embodiment of the present invention, the audio renderer 200 includes a distance information provider 701, a BRIR modifier 704, a tracking information provider 702, a BRIR selector 703, and a filter 705.

The distance information provider 701 provides information regarding the distance d between a user (listener) and a sound image. The tracking information provider 702 provides a localization point ($\theta$, $\Phi$) of the sound image to the BRIR selector 703. The tracking information provider 702 may be a head tracker for tracking movement of the user or the user may directly provide related information through the user control interface (300 in FIG. 3). For example, the sound localization point ($\theta$, $\Phi$) provided by the tracking information provider 702 is information about an azimuth angle $\theta$ and an altitude angle $\Phi$. The BRIR selector 7032 extracts BRIR data $B_L$ and $B_R$ corresponding to the sound localization point ($\theta$, $\Phi$) provided by the tracking information provider 702 from a BRIR DB 7021. In this case, HRTF data may be used instead of the BRIR data.

The BRIR modifier 704 receives information (e.g. the distance information, room type information, and BRIR data $B_L$ and $B_R$) from the distance information provider 701 and the BRIR selector 703 and generates output signals $B_L'$ and $B_R'$ according to a new distance rendering method. The output signals $B_L'$ and $B_R'$ of the BRIR modifier 704 may be obtained by extracting the BRIR data $B_L$ and $B_R$ corresponding to the sound localization point ($\theta$, $\Phi$) from the BRIR DB 7021 and then modifying the extracted BRIR data $B_L$ and $B_R$ with reference to information about a distance so as to maintain a correlation characteristic caused by change in distance The audio renderer 200 according to the second embodiment of the present invention adjusts a correction value using the new distance rendering method so as to maintain a binaural correlation characteristic. Hereinafter, a detailed configuration of the audio renderer 200 and the distance rendering method according to the second embodiment of the present invention will be described with reference to FIGS. 10 to 12.

Figure 10:
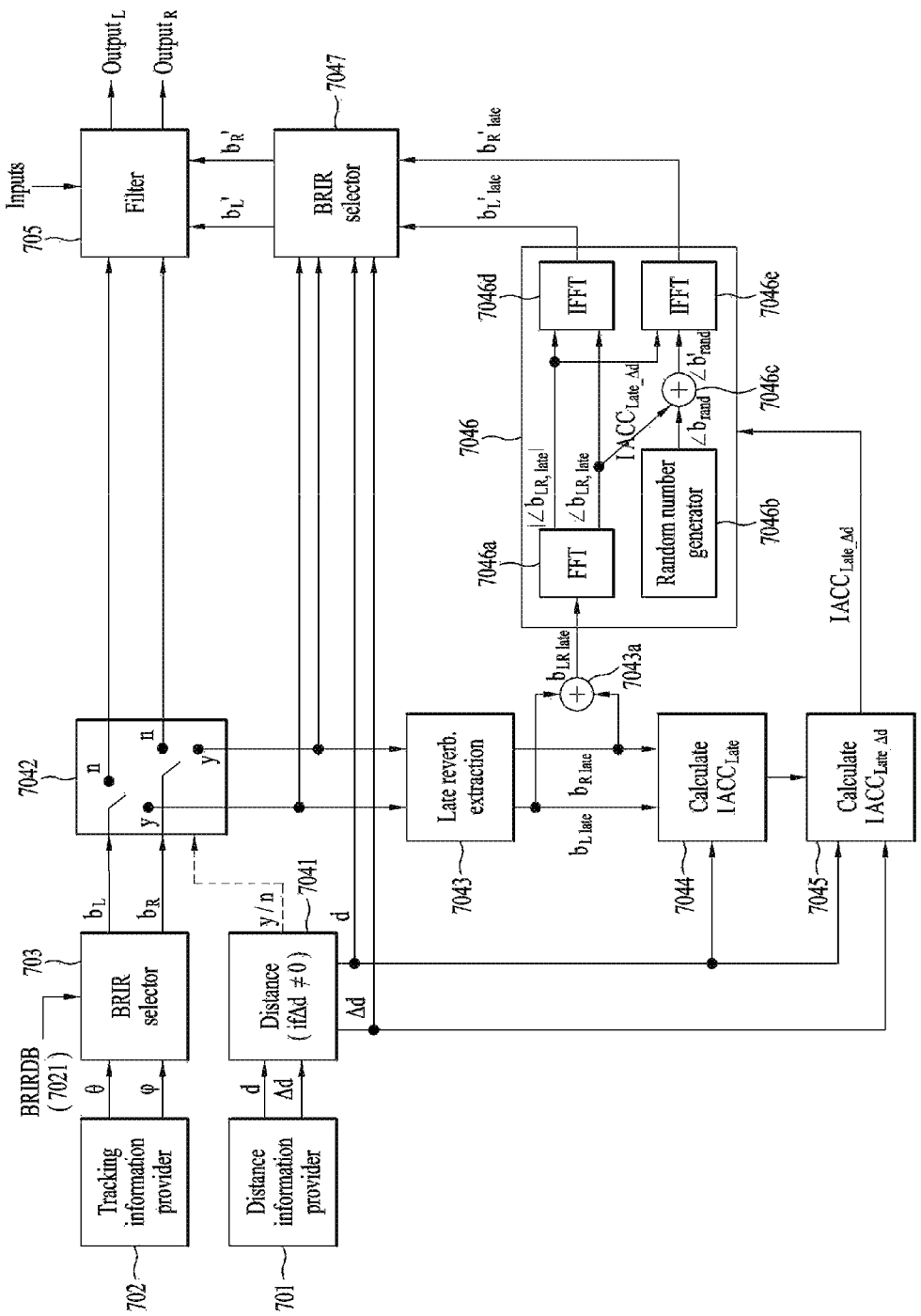
FIG. 10 illustrates a detailed configuration of a renderer to which a new distance rendering method is applied according to the second embodiment of the present invention.

FIG. 10 illustrates a detailed configuration of the audio renderer 200 to which the new distance rendering method is applied according to the second embodiment of the present invention.

Referring to FIG. 10, an entire process of performing distance rendering by adjusting correlation of a late reverberation part of a room response is illustrated. If direction information of a sound image in an arbitrary space is provided by a head tracker or a user through the tracking information provider 702, the BRIR selector 703 extracts BRIR data $b_L$ and $b_R$ corresponding to the provided tracking information ($\theta$, $\Phi$) from the BRIR DB 7021. However, if there is no BRIR DB, a BRIR may be modeled.

The distance information provider 701 provides information about the distance d between a user and a sound image and a distance variation $\Delta d$. A distance determiner 7041 determines whether the location of the user is changed, using the information about the distance d and the distance variation $\Delta d$ provided by the distance information provider 701. That is, if it is determined that a relative location of the user has been changed, the distance determiner 7041 controls the switching means 7042 to select an operation according to a path "y". If it is determined that the relative location of the user has not been changed, the distance determiner 7041 controls the switching means 7042 to select an operation according to a path "n".

First, the operation according to the path "n" through the switching means 7042 will now be described. That is, the operation is performed in the case in which the distance variation $\Delta d$ provided by the distance information provider 7014 is 0, i.e., when the relative location of the user is not changed. In this case, a switch flag of the switching means 7042 is selected as the path "n". The filter 705 performs filtering on the BRIR data $b_L$ and $b_R$ provided by the BRIR selector 703 together with an input audio signal s and outputs rendered audio signals $Output_L$ and $Output_R$.

Next, the operation according to the path "y" through the switching means 7042 will now be described. That is, the operation is performed in the case in which the distance variation $\Delta d$ provided by the distance information provider 701 is not 0 (i.e., $\Delta d \neq 0$), i.e., when the relative location of the user is changed. In this case, the switch flag of the switching means 7042 is selected as the path "y".

If the user moves (i.e., $\Delta d \neq 0$) in an arbitrary space, a late reverberation extraction unit 7043 extracts late reverberation parts $b_{L,late}$ and $b_{R,late}$ of a BRIR. Next, two processes of using interaural cross correlation (IACC) information are performed. First, an IACC at a changed location, i.e., $IACC_{Late\_\Delta d}$, is estimated. Second, a response of the late reverberation part is generated so as to satisfy $IACC_{Late\_\Delta d}$.

In the first process, an $IACC_{Late}$ calculation unit 7044 calculates an IACC of the extracted responses $b_{L,late}$ and $b_{R,late}$, i.e., $IACC_{Late}$. An $IACC_{Late\_\Delta d}$ calculation unit 7045 estimates an IACC at a changed location, i.e., $IACC_{Late\_\Delta d}$, with reference to the existing information about the distance d and the distance variation Δd.

In the second process, an adder 7043a adds the two extracted responses $b_{L,late}$ and $b_{R,late}$ to output one response $b_{LR,late}$. Next, a transformer 7046 generates new responses $b_{L,late}'$ and $b_{R,late}'$ so that the response signals $b_{L,late}'$ and $b_{R,late}'$ have the same correlation with $IACC_{Late\_\Delta d}$ estimated in the first process.

Next, a BRIR modification unit 7047 outputs new BRIR responses $b_L'$ and $b_R'$ by adjusting a gain of the generated responses $b_{L,late}'$ and $b_{R,late}'$ in proportion to a distance variation of a user. Lastly, the filter 705 performs filtering on the input signal s and the BRIR signals $b_L'$ and $b_R'$ and outputs the rendered audio output signals Output$_L$ and Output$_R$.

Figure 12:
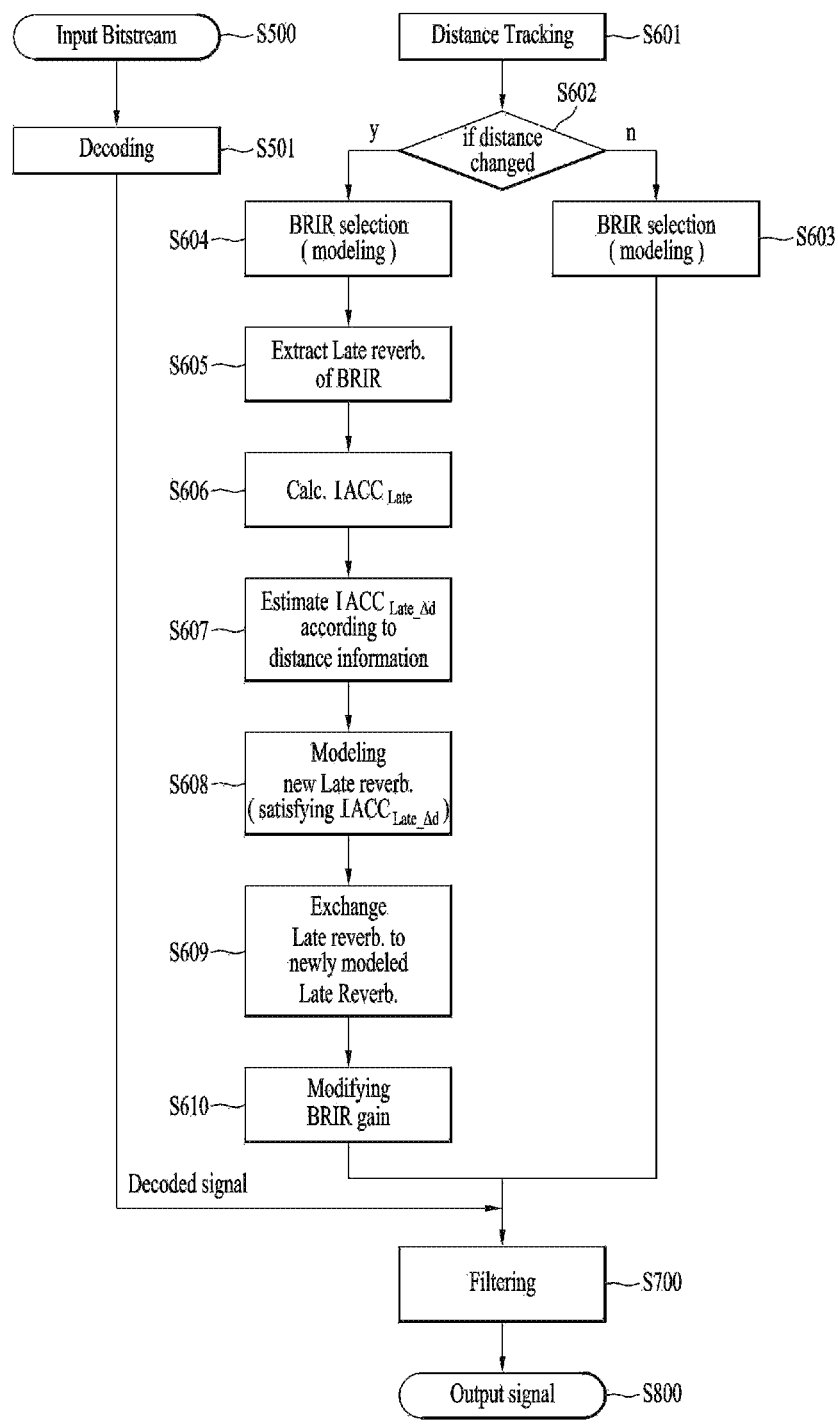
FIG. 12 is a flowchart illustrating the new distance rendering method applied to output of an audio signal according to the second embodiment of the present invention.

FIG. 12 is a flowchart illustrating a new distance rendering method applied to output of an audio signal according to the second embodiment of the present invention. A bitstream is received (S500). The bitstream is decoded and output as a decoded signal (S501). It is determined through a distance tracking process (S601) whether there is change in distance (S602). If there is change in distance, the next process (path "y") is performed. A BRIR is extracted (or modeled) from the BRIR DB with reference to head tracking information (S604). A late reverberation part of the BRIR is extracted (S605). An IACC of the extracted late reverberation part, i.e., $IACC_{Late}$, is calculated (S606). An IACC at a changed location, i.e., $IACC_{Late\_\Delta d}$, is estimated with reference to information about a distance variation (S607). A late reverberation part of the (substantially equal) BRIR corresponding to $IACC_{Late\_\Delta d}$ is modeled (S608). A late reverberation part of an existing BRIR is replaced with the newly modeled late reverberation part (S609). A gain of the BRIR is modified with reference to the information about the distance variation (S610). The modified BRIR is filtered in the decoded signal output in step S501 (S700). As a result of filtering, a rendered audio signal is output (S800).

Meanwhile, if it is determined that there is no change in distance in step S602, the next process (path "n") is performed. A BRIR is extracted (modeled) from the BRIR DB with reference to the head tracking information (S603). Next, the extracted BRIR is filtered together with the decoded signal output in step S501 (S700). As a result of filtering, the rendered audio signal is output (S800).

A process from steps S605 to S610 in FIG. 12 will now be described in more detail with reference to FIG. 10.

If a user moves (Δd≠0), the late reverberation extraction unit 7043 extracts only a late reverberation part of a BRIR. There are many methods of extracting the late reverberation part of the BRIR. Generally, since components after about 50 ms to 80 ms of a response are regarded as the late reverberation part, in the present invention, only response components after about 80 ms are extracted as indicated by Equation (4).

$$b_{ch,late}(n) = \begin{cases} 0, & \text{if } n \le 80 \text{ ms} \\ b_{ch}(n), & \text{if } n > 80 \text{ ms} \end{cases}, ch = L, R \quad (4)$$

Next, $IACC_{Late}$ is calculated using the extracted responses $b_{L,late}$ and $b_{R,late}$. IACC represents a correlation between two sound pressures measured at both ears and is calculated as indicated by Equation (5).

$$IACF(\tau) = \frac{\int_{t_1}^{t_2} p_L(t)p_R(t+\tau)d\tau}{\left(\int_{t_1}^{t_2} p_L^2(t)dt \int_{t_1}^{t_2} p_R^2(t)dt\right)^{1/2}} \quad (5)$$

$$IACC = |IACF(\tau)|_{max}, \text{ for } -1 < \tau < +1 \text{ ms}$$

In Equation (5), $p_L$ and $p_R$ denote sound pressures measured at the left ear and the right ear, respectively. In the second embodiment of the present, $p_L$ and $p_R$ are regarded as a BRIR ($b_L$, $b_R$). As two response characteristics measured at both ears become similar, the IACC approximates to 1 and, if the two response characteristics have no relation, the IACC approximates to 0. In other words, the IACC differs according to the distance between a user and a sound image. If the distance between the user and the sound image is short, the IACC is calculated as a value approximating to 1 and, if the distance between the user and the sound image is long, the IACC is calculated as a value approximating to 0. This is because, as the relative distance becomes longer, a spatial reverberation part rather than a direct part of the sound image is greatly influenced. If a gain of a direct part of a BRIR is changed to be small and therefore a D/R ratio is reduced, the user may feel as though the sound image is becoming distant. However, since $IACC_{Late}$ is not changed, a sound image characteristic recognized at both ears is not changed. Therefore, a response should be changed such that the sound image characteristic may differ according to change in location of the user. The second embodiment of the present invention performs the following process in order to change a response characteristic according to change in location of the user.

$IACC_{Late\_\Delta d}$ is estimated from $IACC_{Late}$ in proportion to a moved distance and is indicated by Equation (6).

$$IACC_{Late\_\Delta d} = \max\left(IACC_{Late} + \left(\frac{IACC_{Late} - 1}{d - 0.15}\right) \cdot \Delta d, 0\right) \quad (6)$$

Figure 11:
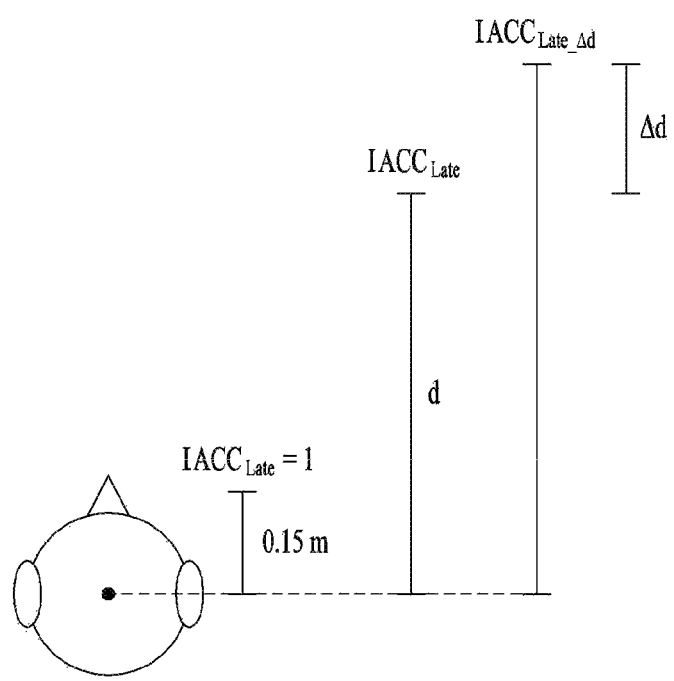
FIG. 11 is a view referred to for describing the new distance rendering method according to the second embodiment of the present invention.

Referring to FIG. 11, a distance from the middle of the head of a person to the front (front of the nose) is about 0.15 m and it is assumed that $IACC_{Late}$ is 1 when a sound image is located at the front of the person. Therefore, if information about the location of the front of the person and $IACC_{Late}$ measured at a distance d are used, $IACC_{Late\_\Delta d}$ at a location changed by Δd may be estimated. To generate a response of a late reverberation part satisfying $IACC_{Late\_\Delta d}$, the two extracted BRIR responses $b_{L,late}$ and $b_{R,late}$ are added to output the response $b_{LR,late}$.

Next, in the transformer 7046, an FFT unit 7046a transforms the response $b_{LR,late}$ into a frequency-axis signal to be divided into a magnitude component $|b_{LRlate}|$ and a phase component $\angle b_{LR,late}$. A random number generator 7046b generates a random number $\angle b_{rand}$ in the range of [−π, π]. However, since the random number $\angle b_{rand}$ is uncorrelated with $\angle b_{LR,late}$, $\angle b_{LR,late}$ is multiplied with $IACC_{Late\_\Delta d}$ and the multiplied result is added to $\angle b_{rand}$ to generate $\angle b'_{rand}$ (i.e., $\angle b'_{rand}=(IACC_{Late\_\Delta d} * \angle b_{LR,late})+\angle b_{rand}$) in an adder 7046c. As a result, a correlation of $\angle b_{LR,late}$ and $\angle b'_{rand}$ is identical to $IACC_{Late\_\Delta d}$. Therefore, an IFFT unit 7046d synthesizes $|b_{LR,late}|$ and $\angle b_{LR,late}$ and transforms the synthesized result into a time-axis signal $b_{L,late}'$ (=$b_{LR,late}$). At the same time, an IFFT unit 7046e synthesizes $|b_{LR,late}|$ and $\angle b'_{rand}$ and transforms the synthesized result into a time-axis signal $b'_{R,late}$. Then a correlation of the two signals $b'_{L,late}$ and $b'_{R,late}$ is identical to $IACC_{Late\_\Delta d}$.

The two new response signals $b'_{L,late}$ and $b'_{R,late}$ output by the transformer 7046 are input to the BRIR modification unit 7047 and are replaced with a late reverberation part of a BRIR as indicated by Equation (7).

$$b'_{ch}(n) = \begin{cases} b_{ch}(n), & \text{if } n \leq 80 \text{ ms} \\ b'_{ch,late}(n), & \text{if } n > 80 \text{ ms} \end{cases}, ch = L, R \quad (7)$$

Additionally, in order to reflect characteristics of a D/R ratio in the modified BRIR, a gain of a direct part of the BRIR in proportion to $\Delta d$ is changed as indicated by Equation (8).

$$g'_{ch,d} = \frac{d^2}{(d+\Delta d)^2} g_{ch,d} \text{ where } g_{ch,d} = b_{ch}(n_d), \quad (8)$$

$$n_d = \arg\max_n(b_{ch}(n)), ch = L, R,$$

$$b'_{ch}(n) = \begin{cases} g'_{ch,d}, & \text{if } n = n_d \\ b'_{ch}(n), & \text{elsewhere} \end{cases}, ch = L, R \quad (9)$$

In Equation (8), d denotes the distance between a user and a sound image and the square of d and the square of (d+Δd) are applied in consideration of an inverse square law indicating that the magnitude of sound pressure is inversely proportional to the square of the distance. $g_{ch,d}$ denotes a gain value of a direct part and may be obtained by searching for a maximum value of $b_{ch}(n)$ of the BRIR and $n_d$ denotes a timing at which the BRIR has a maximum value. Accordingly, finally modified responses of the BRIR modification unit 7047, i.e., output responses $b_L'$ and $b_R'$, may be obtained by replacing the components of a late reverberation part with reference to Equations (7), (8), and (9) and modifying a gain of the direct part.

A distance rendering method and apparatus in accordance with an embodiment of the present invention have the following effects.

First, a room response characteristic can be maintained in an arbitrary space and, therefore, more realistic audio can be provided.

Second, since a room response characteristic can be maintained even in a VR space, a natural and realistic effect can be provided even in any virtual space by configuring a VR space characteristic.

Third, since a binaural correlation is also adjusted, more realistic audio can be provided during configuration of a binaural room impulse response (BRIR).

The present invention may be implemented as computer-readable code that can be written on a computer-readable medium in which a program is recorded. The computer-readable medium may be any type of recording device in which data that can be read by a computer system is stored. Examples of the computer-readable medium include a hard disk drive (HDD), a solid state drive (SSD), a silicon disk drive (SDD), a read only memory (ROM), a random access memory (RAM), a compact disc (CD)-ROM, a magnetic tape, a floppy disk, an optical data storage, and a carrier wave (e.g., data transmission over the Internet). The computer may include an audio decoder and a renderer. It will be apparent to those skilled in the art that various modifications and variations can be made in the present invention without departing from the spirit or scope of the invention. Thus, the present invention is intended to cover the modifications and variations of this invention provided they come within the scope of the appended claims and their equivalents.

What is claimed is:

1. An audio distance rendering method used for audio output, the method comprising:
   receiving a decoded audio signal;
   checking whether a distance between a user and a sound image is changed; and
   when the distance is changed, adjusting a correlation of a late reverberation part of a binaural room impulse response (BRIR) based on the changed distance,
   wherein adjusting the correlation of the late reverberation part of the BRIR includes:
   extracting the late reverberation part of the BRIR,
   calculating a parameter $IACC_{Late}$ corresponding to an interaural cross correlation (IACC) of the extracted late reverberation part,
   estimating a parameter $IACC_{Late\_\Delta d}$ corresponding to an IACC at a changed location with reference to information about a distance variation $\Delta d$,
   modeling the late reverberation part of the BRIR so as to have a correlation corresponding to the estimated parameter $IACC_{Late\_\Delta d}$ and replacing an existing late reverberation part with the modeled late reverberation part, and
   changing a gain of the BRIR based on the modeled late reverberation part according to the change in the distance.

2. An apparatus comprising:
   an audio decoder configured to decode an audio signal; and
   an audio renderer operatively connected to the audio decoder and configured to:
   check whether a distance between a user and a sound image is changed, and
   when the distance is changed, adjust a correlation of a late reverberation part of a binaural room impulse response (BRIR) based on the changed distance,
   wherein adjusting the correlation of the late reverberation part of the BRIR includes:
   extracting the late reverberation part of the BRIR,
   calculating a parameter $IACC_{Late}$ corresponding to an interaural cross correlation (IACC) of the extracted late reverberation part,
   estimating a parameter $IACC_{Late\_\Delta d}$ corresponding to an IACC at a changed location with reference to information about a distance variation $\Delta d$,
   modeling the late reverberation part of the BRIR so as to have a correlation corresponding to the estimated parameter $IACC_{Late\_\Delta d}$ and replacing an existing late reverberation part with the modeled late reverberation part, and
   changing a gain of the BRIR based on the modeled late reverberation part according to the change in the distance.

* * * * *